US011983169B2

(12) United States Patent
Forghani (10) Patent No.: US 11,983,169 B2
(45) Date of Patent: *May 14, 2024

(54) OPTIMIZATION OF DATABASE WRITE OPERATIONS BY COMBINING AND PARALLELIZING OPERATIONS BASED ON A HASH VALUE OF PRIMARY KEYS

(71) Applicant: Capital One Services, LLC, McLean, VA (US)

(72) Inventor: Behdad Forghani, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,674

(22) Filed: Oct. 28, 2022

(65) Prior Publication Data

US 2023/0049797 A1 Feb. 16, 2023

Related U.S. Application Data

(63) Continuation of application No. 16/846,576, filed on Apr. 13, 2020, now Pat. No. 11,514,026, which is a continuation of application No. 16/542,619, filed on Aug. 16, 2019, now Pat. No. 10,664,470.

(51) Int. Cl.
*G06F 16/23* (2019.01)
*G06F 16/22* (2019.01)

(52) U.S. Cl.
CPC ........ *G06F 16/2379* (2019.01); *G06F 16/221* (2019.01); *G06F 16/2255* (2019.01)

(58) Field of Classification Search
None
See application file for complete search history.

(56) References Cited

U.S. PATENT DOCUMENTS 6,882,993 B1 * 4/2005 Lawande ............ G06F 16/2393
707/999.102
8,032,885 B2 10/2011 Fish
8,285,673 B1 * 10/2012 Patsenker ........... H04L 67/1097
707/615
2006/0004750 A1 1/2006 Huang et al.
(Continued)

FOREIGN PATENT DOCUMENTS

EP 2752778 A1 7/2014

OTHER PUBLICATIONS

Jan. 1, 2019—About change data capture (SQL server). Microsoft.

*Primary Examiner* — Kannan Shanmugasundaram
(74) *Attorney, Agent, or Firm* — Banner & Witcoff, Ltd.

(57) ABSTRACT

Methods and systems disclosed herein may optimize write operations in a transaction to reduce the number of operations to the point where each of the write operations may be performed in parallel. The writer optimizer may review a first write operation and a second write operation to determine whether the first write operation and the second write operation write to the same row in the same table. When the first write operation and the second write operation write to the same row in the same table, the first write operation and the second write operation may be combined to generate a functionally-equivalent third write operation. The third write operation may reduce the number of operations in the transaction by replacing both the first write operation and the second write operation.

20 Claims, 9 Drawing Sheets

(56) References Cited

U.S. PATENT DOCUMENTS

| | | |
|---|---|---|
| 2007/0214168 A1 | 9/2007 | Sandrock Grabsky et al. |
| 2009/0171999 A1 | 7/2009 | McColl et al. |
| 2011/0173619 A1 | 7/2011 | Fish |
| 2012/0078975 A1 | 3/2012 | Chen et al. |
| 2012/0299965 A1 | 11/2012 | Agarwal et al. |
| 2013/0007069 A1 | 1/2013 | Chaliparambil et al. |
| 2015/0074062 A1 | 3/2015 | Krein et al. |
| 2016/0132543 A1 | 5/2016 | Bester et al. |
| 2016/0171039 A1* | 6/2016 | Eisenreich .......... G06F 16/2365 707/698 |
| 2016/0224632 A1 | 8/2016 | Lu et al. |
| 2017/0371914 A1* | 12/2017 | Bourbonnais ........... G06F 16/27 |
| 2018/0329966 A1 | 11/2018 | Ranganathan et al. |
| 2019/0042571 A1 | 2/2019 | Li et al. |
| 2019/0065542 A1 | 2/2019 | Baker et al. |
| 2019/0268401 A1 | 8/2019 | Desai et al. |
| 2020/0210481 A1 | 7/2020 | Niebielski et al. |
| 2020/0394196 A1 | 12/2020 | Shivanna et al. |

* cited by examiner

**Total Delay = n*(RD+WT+AD)**

FIG. 8B

Total Delay' = RD'+WT'+AD

OPTIMIZATION OF DATABASE WRITE OPERATIONS BY COMBINING AND PARALLELIZING OPERATIONS BASED ON A HASH VALUE OF PRIMARY KEYS

CROSS-REFERENCE TO RELATED APPLICATIONS

This application is a continuation of co-pending U.S. patent application Ser. No. 16/846,576, filed on Apr. 13, 2020 and entitled "Optimization of Database Write Operations By Combining and Parallelizing Operations Based on a Hash Value of Primary Keys," which is a continuation of U.S. patent application Ser. No. 16/542,619, filed on Aug. 16, 2019 and entitled "Optimization of Database Write Operations By Combining and Parallelizing Operations Based on a Hash Value of Primary Keys," which issued as U.S. Pat. No. 10,664,470 on May 26, 2020 the disclosures of which are hereby incorporated by reference in their entireties.

This application is also related to U.S. patent application Ser. No. 17/563,288, filed Dec. 28, 2021 and entitled "Parallel Processing of Change Data Capture;" U.S. patent application Ser. No. 16/782,198, filed Feb. 5, 2020 and entitled "Parallel Processing of Change Data Capture," which issued as U.S. Pat. No. 11,243,942 on Feb. 8, 2022; and U.S. patent application Ser. No. 16/542,488, filed Aug. 16, 2019 and entitled "Parallel Processing of Change Data Capture," which issued as U.S. Pat. No. 10,599,639 on Mar. 24, 2020, the disclosures of which are hereby incorporated by reference in their entireties.

FIELD OF USE

Aspects of the disclosure relate generally to database write operations and more specifically to optimizing database write operations by combining write operations that operate on the same row of the same table and writing a set of operations to the database in parallel.

BACKGROUND

Mobile applications and server applications frequently transact with data and information stored in databases. These transactions may include a plurality of operations, such as read operations that request data and information from a database or write operations that update data and information contained in the database. Each operation includes a request—which includes a request delay, a read or write time—which consumes an amount of time, and an acknowledgement—which also includes an acknowledgement delay. Moreover, each operation is performed in series. Thus, the total time to perform a single transaction can be determined by multiplying the number of operations by the amount of time to perform each transaction. Furthermore, an operation may lock a row, preventing other operations from reading or writing to the row. The combination of performing operations in series and row locks for operations performed in parallel may significantly inhibit the performance of a database, which may prevent the database from scaling.

Aspects described herein may address these and other problems, and generally improve the quality, efficiency, and speed of performing database operations in parallel and avoiding row locks.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Methods and systems as described herein may optimize write operations in a transaction to reduce the number of operations in the transaction such that each write operation corresponds to one row in a table. A writer optimizer may review a first write operation and a second write operation in the transaction to determine whether the first write operation and the second write operation write to the same row in the same table. When the first write operation and the second write operation write to the same row in the same table, the first write operation and the second write operation may be combined to generate a functionally-equivalent third write operation, which replaces the first write operation and the second write operation. This process may be repeated until each write operation corresponds to one row and no two write operations write to the same row. By reducing the number of operations in this way, the operations in the transaction may be performed in parallel since the order of operations is only important when operations write to the same row and row locks may be avoided.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for optimizing database write operations by combining write operations in a transaction that write to the same row. When no two write operations in the transaction write to the same row, the transaction may perform the write operations in parallel. As noted above, prior art systems perform write operations in a transaction in series, which is time-consuming, bandwidth-consuming, and results in row locks.

Systems as described herein may include algorithms and techniques for reducing the number of write operations in a transaction such that each write operation in the transaction write to a different row. The reduced number of write operations may allow the write operations to be executed in parallel, which significantly reduces the delays associated with performing write operations in series. Furthermore, row locks may be eliminated because no two write operations write to the same row. Thus, the techniques described herein improve database operations by reducing the amount of time it takes to commit a transaction to a database.

Figure 1:
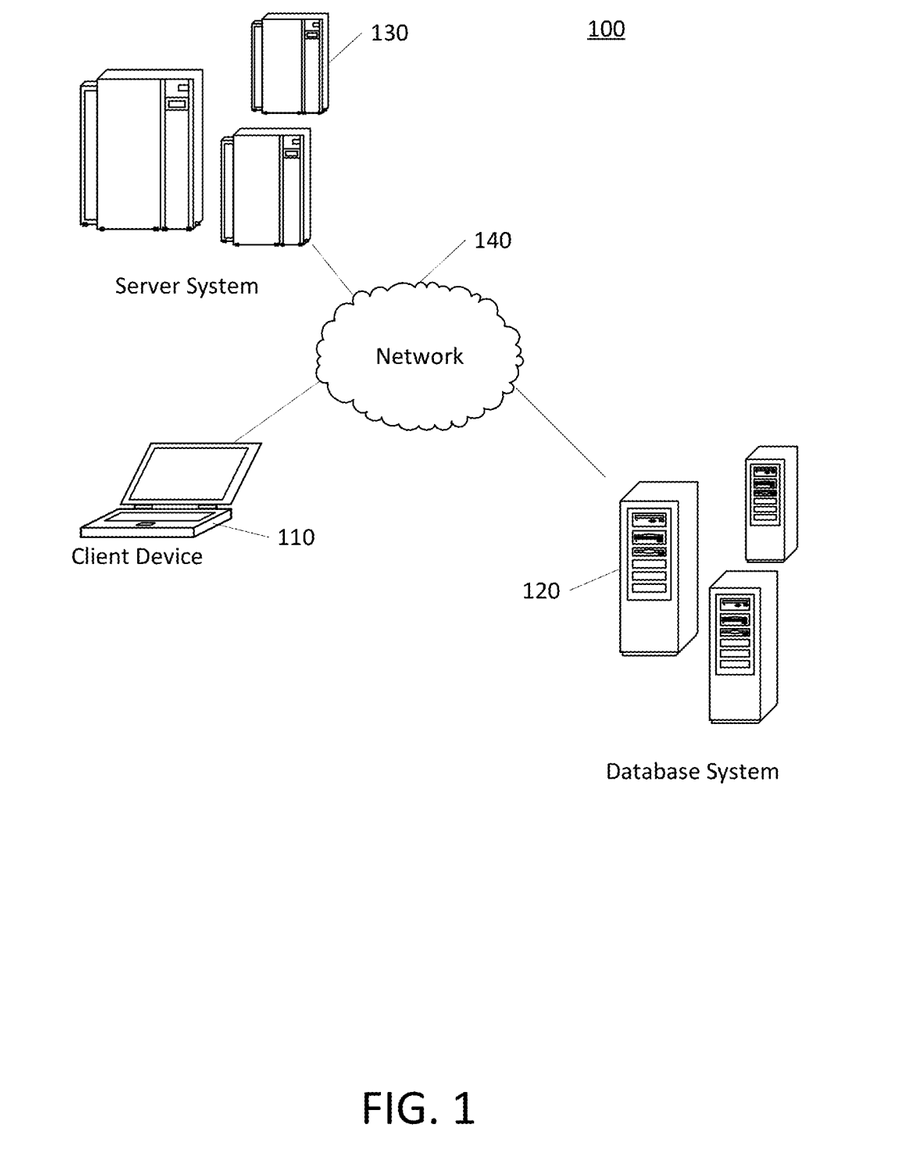
FIG. 1 shows an example of a control processing system in which one or more aspects described herein may be implemented.

FIG. 1 shows a system 100. The system 100 may include at least one client device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client device 110 may access server applications and/or resources using one or more client applications (not shown) as described herein. Client device 110 may be a mobile device, such as a laptop, smart phone, or tablet, or computing devices, such as a desktop computer or a server. Alternatively, client device 110 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 120 may be configured to maintain, store, retrieve, and update information for server system 130. Further, database system may provide server system 130 with information periodically or upon request. In this regard, database system 120 may be a distributed database capable of storing and computing large volumes of data across clusters of nodes.

Server system 130 may be configured with a server application (not shown) that is capable of interfacing with client application and database system 120 as described herein. In this regard, server system 130 may be a stand-alone server, a corporate server, or a server located in a server farm or cloud-computer environment. According to some examples, server system 130 may be a virtual server hosted on hardware capable of supporting a plurality of virtual servers.

Network 140 may include any type of network. For example, network 140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
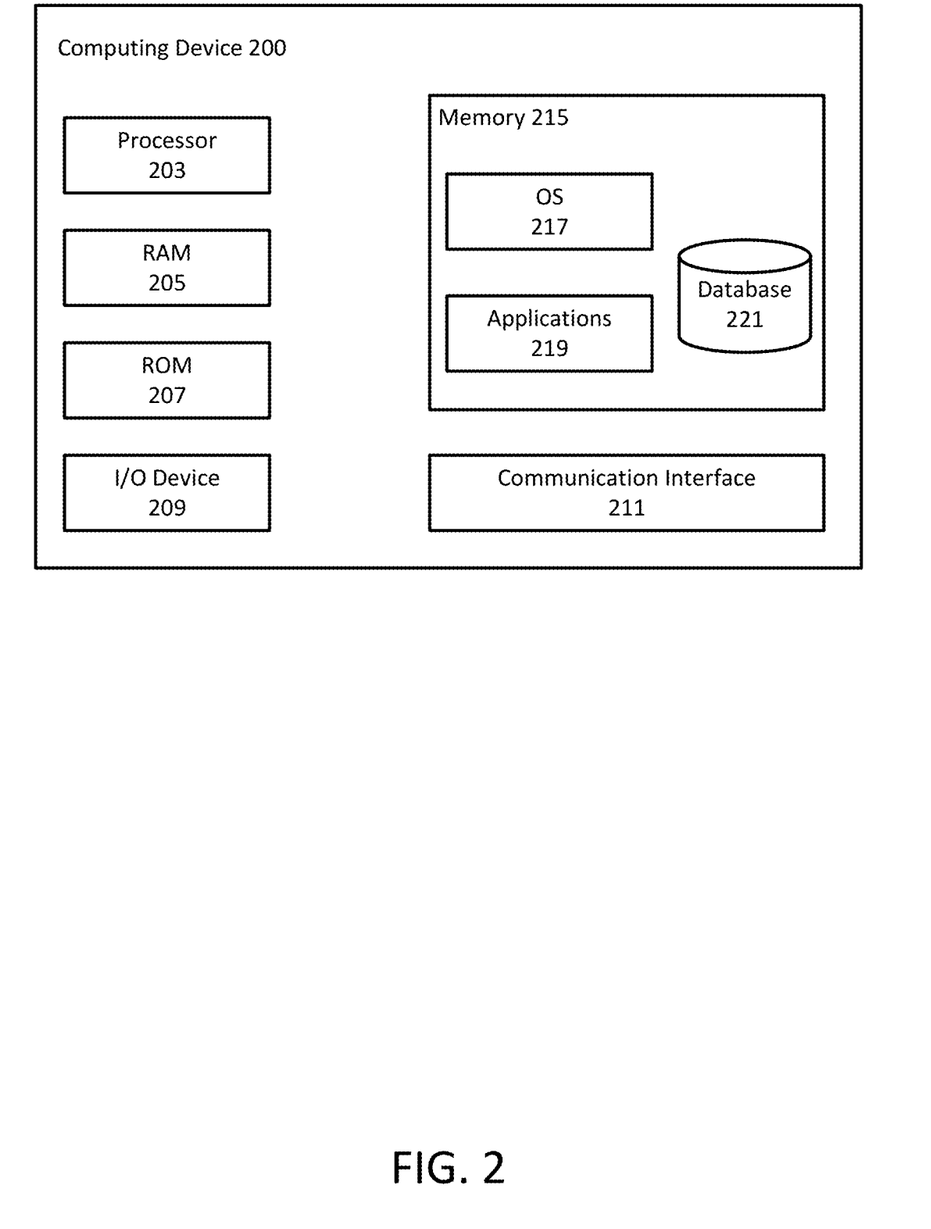
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
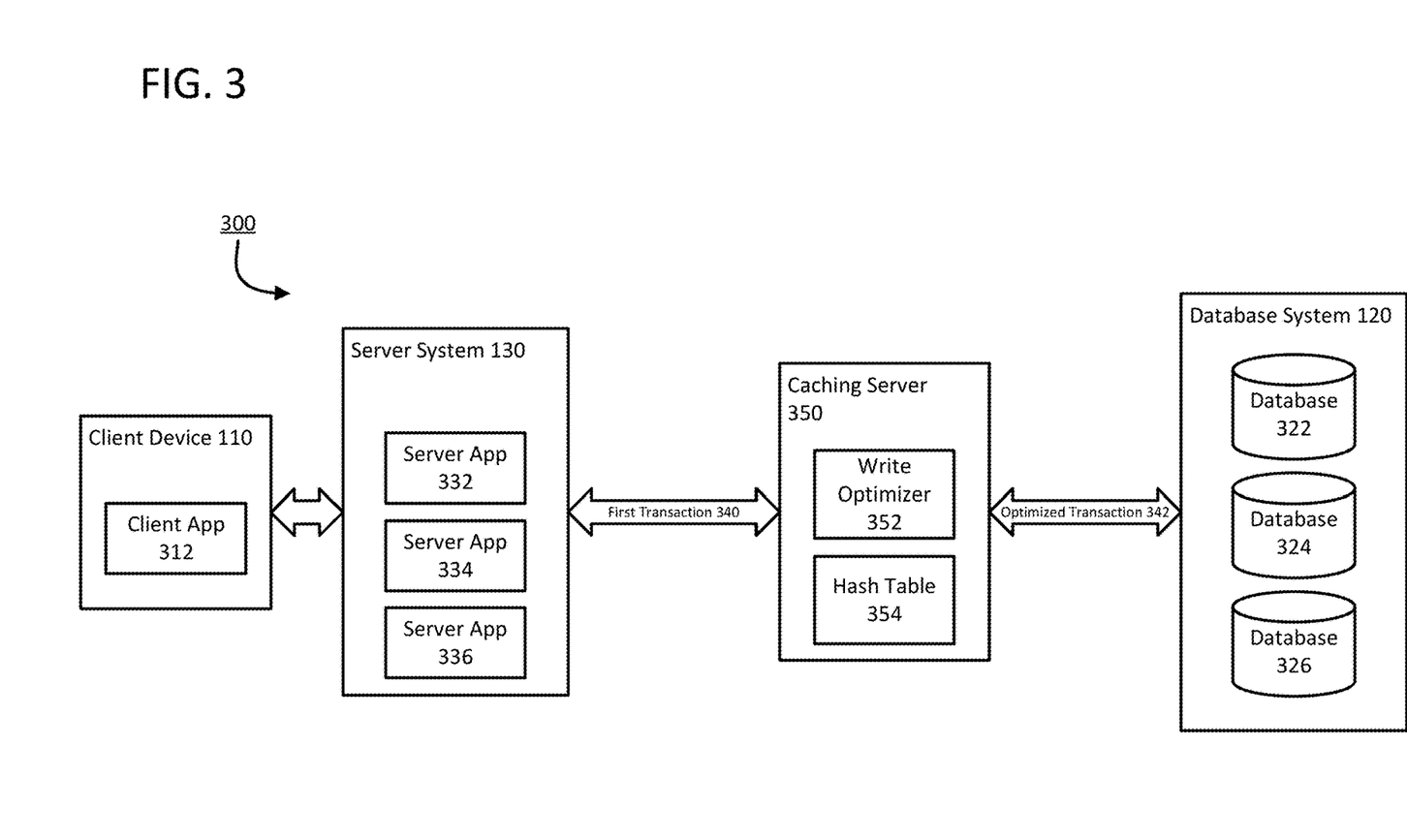
FIG. 3 shows an example of a system where a client device interacts with a server and the server interacts with a database according to one or more aspects described here.

Most applications operating on client devices interface with a corresponding server application. As a result of the interaction between the client application and the server application, the server application may update information in a backend database. FIG. 3 shows an overview of a system of an application on a client device interacting with a server application on a server system in such a way that the server application may write information to a back-end database System 300 illustrates a client device 110 communicating with server system 130. Client device 110 may include a client application 312. Similarly, server system 130 may include a first server application 332, a second server application 334, and a third server application 336. Client device 110 and server system 130 may include more or fewer applications.

As noted above, client application 312 may communicate with first server application 332. For example, client application 312 may be a messaging application. The messaging application may contact first server application 332, which may be the server counterpart to the messaging application, in order to update user information, upload a message to another user of the messaging application, or perform another messaging-related task. In another example, client application 312 may be a mobile shopping application, such as Amazon®. The mobile shopping application may contact the counterpart server application (i.e. first server application 332) to place an order, browse inventory, check the status of an order, or some other task. In yet another example, client application 312 may be a mobile banking application. Client application 312 may access first server application 332 to transfer money, check account balances, pay bills, or another banking task. In order to facilitate these tasks and provide the requested information, first server application 332 and server system 130 may store data and information in database system 120. Accordingly, first server application 332 may have permission to access database system 120, and first server application 332 may communicate with database system 120, via caching server 350, to perform the requested tasks and provide the requested information.

Caching server 350 may include a write optimizer 352 and hash table 354. Write optimizer 352 may be software, hardware, or firmware configured to optimize write operations performed to database system 120. The functionality of write optimizer 352 is discussed in greater detail below with respect to FIG. 6. Hash table 354 may be any suitable table or database capable of storing write operations therein. In some embodiments, hash table 354 may be a nested hash table that allows queries to identify the database and table an operation operates on and whether the operation executes on the same row as another operation. As will be discussed in greater detail below, a hash value may be generated from a database identifier, a table identifier, and a set of values in the primary key columns of a write operation. The hash values may be used to locate write operations that write to the same row. For example, a first write operation may be received and a first hash value may be generated from a database identifier, a second hash value may be generated from a table identifier, and a third hash value may be generated from a first set of values from the primary key columns may be generated. Write optimizer 352 may determine the database and the table that the first write operation writes to using the first hash value and the second hash value, respectively. The third hash value may be used to query the hash table to determine whether the first write operation writes to the same row as any other write operation in the hash table. If the first write operation does not write to the same row as any other write operation, an entry may be created in the hash table for the first write operation. If the first write operation is an update row operation that modifies the value of one of the values in the set of primary key columns, the entry for that row may be removed from the hash table and a new hash value may be calculated based on the new primary key values. The first write operation, with the new hash value, may be added to the hash table before any merge operations are performed. Similarly, if the second operation is an update operation that modifies the value of one of the values in the set of primary key columns, a new hash value may be calculated after the merge operation, the original row may be deleted from the hash table, and the resultant merge operation may be added with the new hash value.

Similarly, for the second write operation, a fourth hash value may be generated from the database identifier of the second write operation, a fifth hash value may be generated from the table identifier of the second write operation, and a sixth hash value may be generated from a second set of values from the primary key columns of a second write operation. As discussed above, the fourth hash value and the fifth hash value may be used to locate the database and table that the second write operation writes to. The sixth hash value may be used to query the hash table to determine whether any operations in the hash table have a hash value equal to the sixth hash value. When the sixth hash value is located in the hash table, the second write operation and the write operation with the matching hash value may be combined. For example, if the third hash value and the sixth hash value are a match, the first write operation and the second write operation may be combined since both operations write to the same row. When the query indicates that the sixth hash value does not exist in the hash table, the second write operation may be added to the hash table. The process of calculating a hash value from the values in the primary key columns and querying the hash table with the calculated hash value may be repeated for each of the subsequent write operations in the received transaction.

Database system 120 includes a first database 322, a second database 324, and a third database 326. In practice, database system 120 may include more or fewer databases. Database system 120 may provide a variety of databases including, but not limited to, relational databases, hierarchical databases, distributed databases, in-memory databases, flat file databases, XML databases, NoSQL databases, graph databases, and/or a combination thereof. While communications between first server application 332 and database system 120 may be bi-directional, this disclosure will focus on write operations, such as insert row operations, update row operations, or delete row operations, from first server application 332 to database system 120.

Caching server 350 may be configured to receive and store a first transaction 340 from first server application 332. First transaction may contain a plurality of write operations, including at least one of a first write operation and a second write operation. As will be discussed in greater detail below, write optimizer 352 may analyze the plurality of write operations in first transaction 340 to determine whether any of the write operations may be combined to reduce the number of write operations performed on first database 322.

The reduced number of write operations 342 may be transmitted from caching server 350 to database system 120 to be written to first database 322 as optimized transaction 342. Caching server 350 may transmit optimized transaction 342 to first database 322 after receiving a predetermined number of write operations from first server application 332. In alternative embodiments, caching server 350 may transmit optimized transaction 342 at predetermined time intervals.

Caching server 350 is illustrated as a standalone machine in system 300. However, caching server 350 may be incorporated with database system 120 as part of a caching algorithm. In this regard, caching write operations, before committing the write operations to a database, is more efficient than performing individual write operations on a database. In particular, caching a plurality of write operations and writing them as part of a single transaction reduces bandwidth between first server application 332 and first database 322, as well as reduces the processing overhead of database system 120 by handling write operations collectively instead of individually. While caching a plurality of write operations to commit the plurality of write operations in a single transaction increases efficiency, the plurality of write operations consumes an inordinate amount of time (i.e. >25 minutes) to commit to a database. Thus, there is a need to further improve the efficiency of write operations committed to a database.

Figure 4:
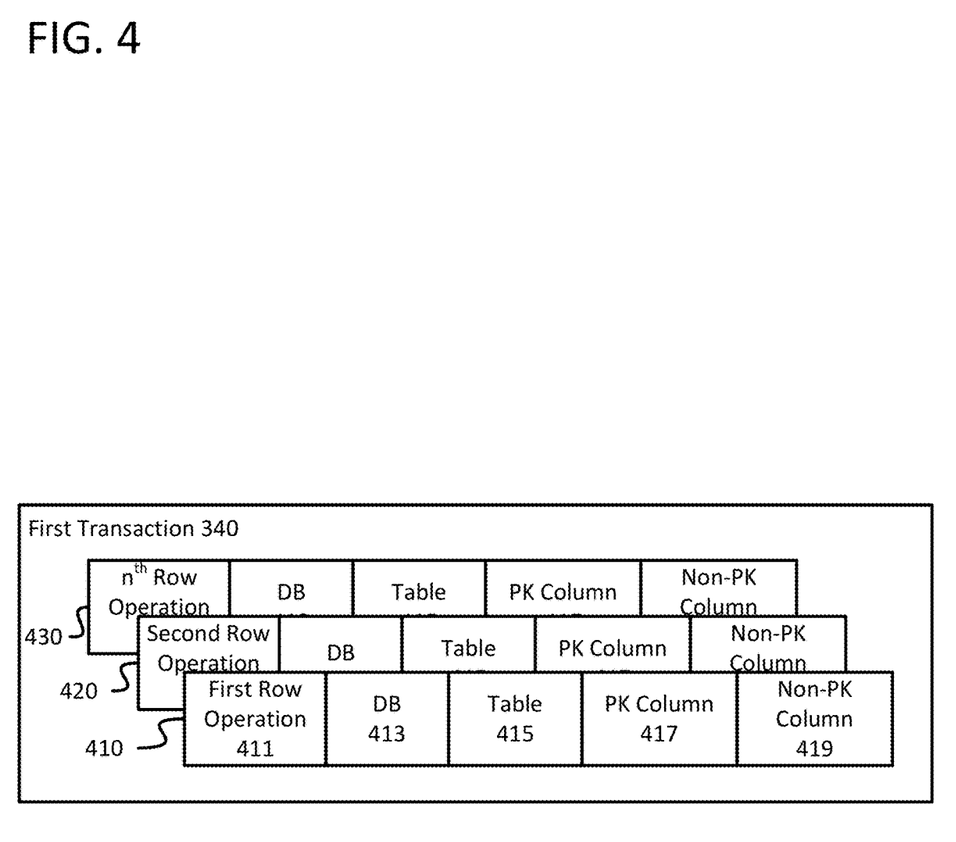
FIG. 4 shows an example of a transaction with multiple write operations in accordance with one or more aspects described herein.

Turning to FIG. 4, an example of a first transaction 340 is shown. First transaction 340 comprises a first operation 410, a second operation 420, and a third operation 430. While first transaction 340 only illustrates three operations, first transaction 400 may include more or fewer operations.

Each of the operations illustrated in first transaction 340 includes a plurality of fields. For example, first operation 410 includes a first row operation 411, a database field 413, a table field 415, a primary key column field 417, and a non-primary key column field 419. First row operation 411 may include a database command and, in preferred embodiments, a write command, such as an insert operation, an update operation, and a delete operation. The insert operation may create a new row in a table of the database, the update operation may modify an existing row in a table of the database, and the delete operation may delete a row in a table of the database. Database field 413 may identify the database on which the first row operation is performed; table field 415 may identify the table, in the database, on which the first row operation is performed. Primary key column 417 may include a first value that uniquely identifies a row on which to perform first row operation 411. In some instances, the first value may be a hash value that is calculated by applying a hashing algorithm to one or more values located in a set of primary key columns of first row operation 411. Non-primary key column 419 may identify the additional columns in a row and the data that may be written to those additional columns in the row identified by primary key column 417.

While first operation 410 illustrates a single primary key column and a single non-primary key column, first operation may include additional primary key columns and non-primary key columns. Further, second operation 420 and third operation 430 may comprise the same fields as first operation 410; however, the values in those fields may vary from first operation. For example, second operation 420 may identify a different table. Alternatively, second operation 420 may include a different value in primary key column 426 and, therefore, identifies a different row than the first operation.

Figure 5:
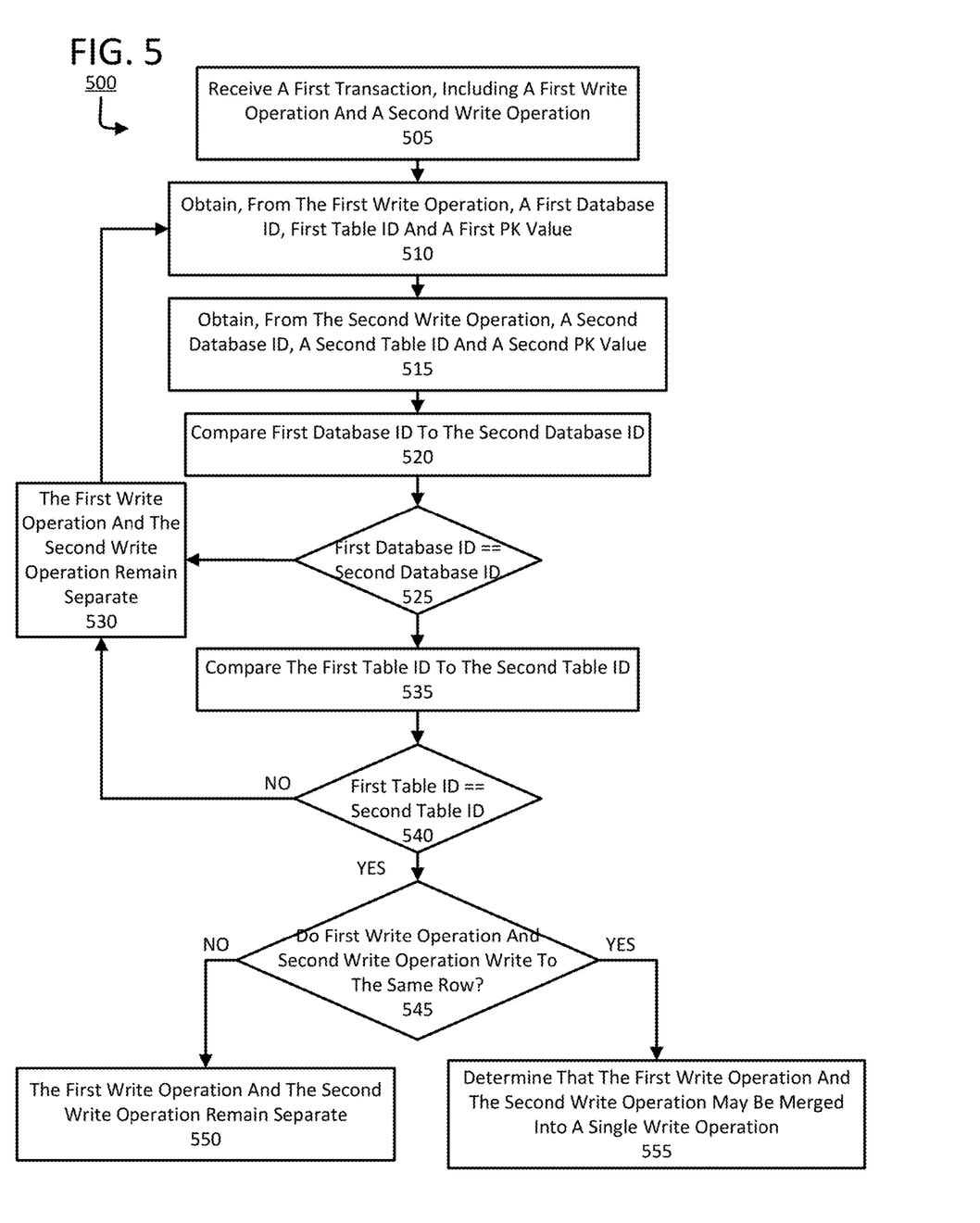
FIG. 5 shows a flow chart of a process for determining whether a first write operation and a second write operation may be combined into a single write operation to reduce the number of write operations in a transaction according to one or more aspects of the disclosure.

While caching database operations is a useful tool in improving the efficiency of database operations, the process of executing database operations involves a considerable amount of processing power and bandwidth resources. For example, calculating the delay time for performing write operations in series may be determined as a product of the number of write operations multiplied by the total time to perform a write operation. In this regard, the total time to perform a write operation may be the sum of the request delay, the write time, and the acknowledgement delay. By combining write operations and performing the write operations in parallel, the delay time for performing write operations may be reduced significantly. Moreover, combining write operations made to the same row eliminates row locks since there is only one write operation performed on each row. FIG. 5 shows a flow chart of a process 500 for determining whether a first write operation and a second write operation may be combined into a single write operation to reduce the number of write operations in a transaction according to one or more aspects of the disclosure. Some or all of the steps of process 500 may be performed using one or more computing devices as described herein.

In block 505, a first transaction may be received from a first server application operating on a server system. The first transaction may be received by caching server 350, or, alternatively, by a caching component of database system 120. In some embodiments, database system 120 may receive the first transaction directly from the server system. As noted above, the first transaction may include a first write operation and a second write operation.

In block 510, a first database identifier, a first table identifier, and first primary key values may be obtained from the first write operation. The first write operation may be analyzed or parsed using a schema to locate the database field, the table field, and the primary key column fields. After locating the database field, the table field, and the primary key column field, the first database identifier, the first table identifier, and the first primary key values may be extracted from the first write operation. As noted above, a first hash value may be generated for the first database identifier and a second hash value may be generated for the first table identifier. A second database identifier, a second table identifier, and a second primary key values may be obtained from the second write operation in a similar manner, in block 515. Similarly, a fourth hash value may be generated for the second database identifier and a fifth hash value may be from the second table identifier.

In block 520, the first database identifier and the second database identifier may be compared. In some embodiments, comparing the first database identifier and the second database identifier may comprise running two queries on hash table 354. The first query may be performed using the first hash value, and the second query may be performed using the fourth hash value. In block 525, a determination may be made as to whether the first database identifier is equal to the second database identifier. That is, a determination may be made as to whether the first write operation and the second write operation operate on the same database. When the first database identifier and the second database identifier are different, process 500 proceeds to block 530, where the first write operation and the second operation remain separate write operations. Additionally, process 500 may return to block 510 to determine whether additional write operations may be combined. In some embodiments, process 500 may iterate through each of the write operations to determine whether any of the write operations write to the same row of the same table in the same database.

When the first database identifier and the second database identifier match, the first table identifier and the second table identifier may be compared in block 535. Similar to the comparison performed on the database identifiers, comparing the first table identifier and the second table identifier may comprise running two queries on hash table 354. The first query may be performed using the second hash value, and the second query may be performed using the fifth hash value. In block 540, a determination may be made as to whether the first table identifier is equal to the second table identifier. In other words, a determination may be made as to whether the first write operation and the second write operation write to the same table. When the first table identifier and the second table identifier are different, process 500 proceeds to block 530, and the first write operation and the second write operation remain separate write operations. As noted above, process 500 may proceed to analyze all of the write operations in the first transaction to determine whether any of the write operations can be combined.

When a pair of write operations that operate on the same table is identified, process 500 proceeds to block 545, where a determination may be made whether the first write operation and the second write operation write to the same row. As noted above, a third hash value may be generated from the one or more first primary key values located in the one or more primary key columns of the first write operation. Accordingly, the first write operation may be stored in a hash table, such as hash table 354. Similarly, a sixth hash value may be determined from one or more second primary key values associated with the one or more primary key columns of the second write operation. The sixth hash value may be used to query the hash table to determine whether the second write operation writes to the same row as any other operation in the hash table. For example, the query may compare the sixth hash value to one or more hash values contained in the hash table, including the third hash value. When the sixth hash value and the third hash value are not equal, a determination may be made, in block 550, that the first write operation and the second write operation write to different rows. Accordingly, in block 550, the first write operation and the second write operation remain separate write operations. In some embodiments, the first write operation and the second write operation may be entered in the hash table as separate entries. However, when the query indicates that the first write operation and second write operation write to the same row, a determination may be made that the first write operation and the second write operation may be merged into a single, third write operation in block 555. As noted above, a hash value may be generated for each subsequent write operation, which may be used to query hash table 354 to determine if the hash value matches any of the entries in the hash table. When the hash value matches an entry in the hash table, the write operations may be combined. When the hash value for the subsequent operation does not appear in the hash table, the subsequent write operation may be added as a row to the hash table. In this regard, using hash tables may represent a more efficient technique for determining whether write operations write to the same row.

In an alternative approach, the determination of whether the first write operation and the second write operation write to the same row may be made by comparing the first primary key value to the second primary key value. If the first primary key value is equal to the second primary key value, a determination may be made that the first write operation and the second write operation write to the same row. Accordingly, the first write operation and the second write operation may be combined into a single operation. When the first primary key value and the second primary key value are not equal, an indication may be provided that the first write operation and the second write operation write to different rows. Therefore, the first write operation and the second write operation may remain separate operations. While this approach may be less efficient than using hash tables, it is simpler to implement.

Figure 6:
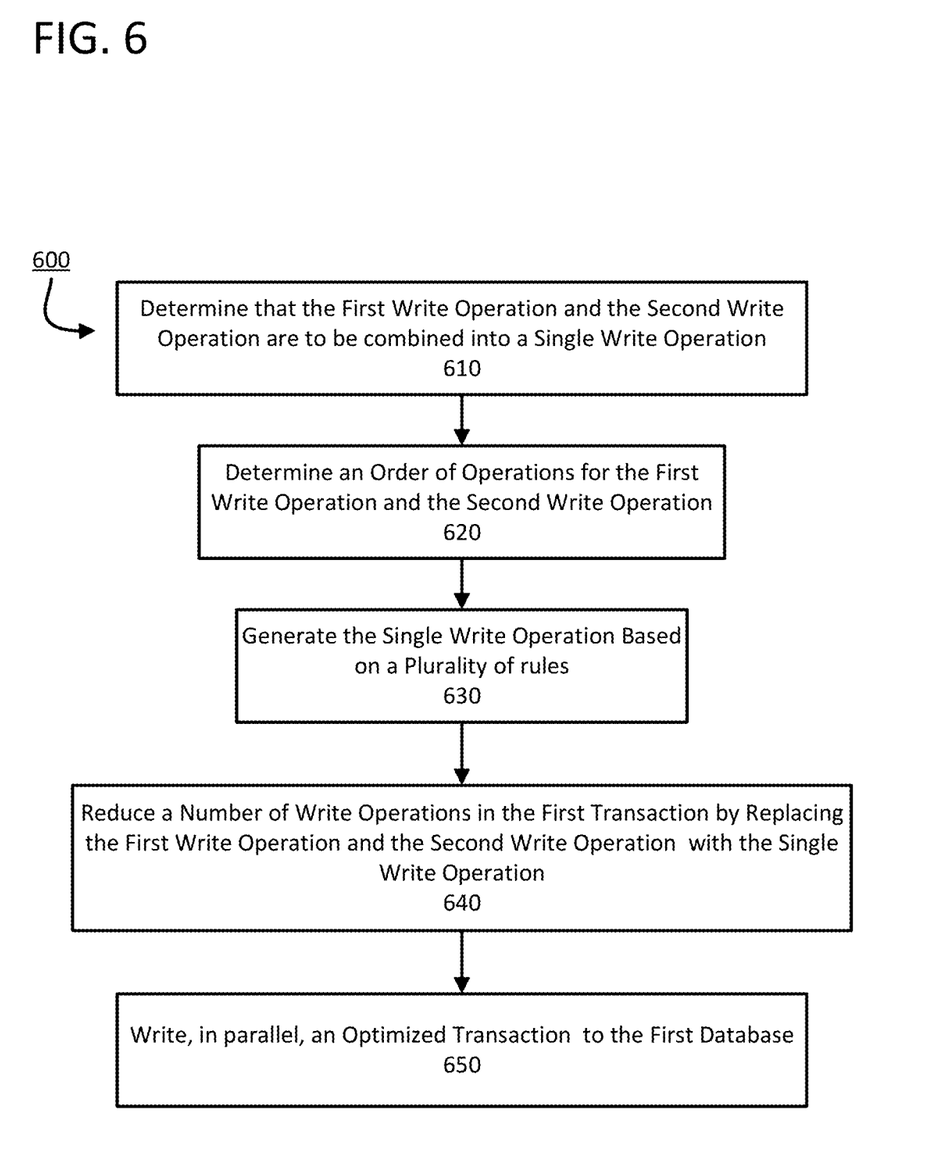
FIG. 6 shows a flow chart of a process for determining how to merge the first write operation and the second write operation into a single, third write operation and writing, in parallel, the reduced the number of write operations to the database according to one or more aspects of the disclosure.

Once a determination is made that the first write operation and second write operation may be combined, the first write operation and second write operation may be analyzed to determine the proper order of operations so the correct data may be written to the database. FIG. 6 shows a flow chart of a process 600 for determining how to merge the first write operation and the second write operation into a single, third write operation and writing, in parallel, the reduced the number of write operations to the database according to one or more aspects of the disclosure.

In block 610, write optimizer 352 may make a determination that the first write operation and the second write operation may be combined into a single, third write operation. In block 620, write optimizer 352 may determine an order of operations for the first write operation and the second write operation. The order of operations may be determined on a number of factors. For example, the order of operations may be based on the type of write operation (i.e., insert row, update row, delete row) being performed. Additionally, or alternatively, the order of operations may be based on the sequence in which the first write operation and the second write operation appear in the first transaction received from first server application 332. In some embodiments, both the type of operation and the sequential order of the operations may be used to determine the order of operations.

In block 630, write optimizer 352 may generate a third write operation from the first write operation and the second write operation in accordance with a plurality of rules. The plurality of rules may take into account the order of operations determined above. In particular, the plurality of rules may account for the type of write operation and the order in which the write operations appear. Five examples of rules included in the plurality of rules is set forth below. For the purposes of the five following examples, the second write operation occurs after the first write operation in the sequence of write operations in the first transaction.

RULE 1. When the first write operation is a first insert row operation and the second write operation is an update row operation, the first write operation and the second write operation may be combined to generate a third write operation. The third write operation may be a second insert row operation. The second insert row operation may be similar to the first row operation. In this regard, the second insert row operation may differ from the first insert row operation by having the data and information from the update row operation overwrite the columns in the first insert row operation. Accordingly, the third write operation may have the same table identifier and the same value (or values) in the primary key column(s) as the first write operation and the second write operation; however, the third write operation may have the updated values from the second write operation in non-primary key columns, where applicable. That is, the second write operation may not update every non-primary key column. Accordingly, the third write operation may reflect the updated values in the non-primary key columns indicated by the update row operation. Additionally, the third write operation may include any additional non-primary key columns identified in the update row operation. The first write operation and second operation may be removed from the plurality of write operations in the first transaction and may be replaced with the third write operation. Thus, the number of write operations in the first transaction may be reduced by the third write operation replacing the first write operation and the second write operation.

RULE 2. When the first write operation is a first update row operation and the second write operation is a second update row operation, the first write operation and the second write operation may be merged to generate a third write operation. The third write operation may be a third update row operation. The third write operation may be similar to the first update operation. The third write operation may have the columns that are common to both the first update operation and the second update operation overwritten with the data and/or values of the second update operation. Additionally, the third write operation may include additional columns that may have been included in the second update row operation. The first write operation and second operation may be replaced in the plurality of write operations by the third write operation. The total number of write operations in the first transaction may be reduced with the third write operation being swapped in for both the first write operation and the second write operation.

RULE 3. When the first write operation is an insert row operation and the second write operation is a delete row operation, the first write operation and the second write operation may be removed. In this regard, an insert row operation followed by a delete row operation may cancel each other out. Since the first write operation and the second write operation cancel each other out, the first write operation and the second write operation may be removed from the plurality of write operations to reduce the number of write operations in the first transaction.

RULE 4. When the first write operation is an update row operation and the second write operation is a delete row operation, the first write operation and the second write operation may be merged to generate a third write operation. The third write operation may be the delete row operation. Because the first write operation may be deleted, the number of write operations in the first transaction is reduced.

RULE 5. When the first write operation is a delete row operation and the second write operation is an insert row operation, the first write operation and the second write operation may be merged to generate a third write operation, wherein the third write operation is an update row operation. In this regard, the row may already exist, and the row is being deleted then re-added to the table. In a more efficient approach, the delete operation may be removed and the insert row operation may be converted to an update row operation with the values from the second write operation. In instances where the second write operation does not include values for certain columns, the third write operation (i.e. the update row operation) may put null values in the columns that do not include values in the second write operation. Accordingly, the number of write operations in the first transaction may be reduced.

In block 640, write optimizer 352 may update the plurality of write operations to reduce the number of write operations by replacing the first write operation and the second write operation with the third write operation. In some embodiments, the number of write operations may be reduced to the point each write operation executes on a different row. That is, no two write operations in the first transaction may write to the same row when committing the first transaction to the first database. To realize this reduction in write operations, process 500 and process 600 may be repeated until each write operation in the reduced number of write operations writes to a different row. While combining two operations is discussed above, several write operations may be analyzed and combined using the techniques described above. Alternatively, or additionally, process 500 and process 600 may iterate through the plurality of write operations until only one write operation for each row remains. In these embodiments, a first write operation and a second write operation may be merged into a third write operation; the third write operation and a fourth write operation may then be combined to generate a fifth write operation. The process may be repeated until no two write operations in the first transaction write to the same row of the same table of the same database. By reducing the number of write operations in the first transaction such that no two write operations write to the same row, the optimized transaction, with the reduced number of write operations, may be written to the first database in parallel, in block 650. This significantly reduces the delays associated with writing transactional data to a database. Furthermore, reducing the number of write operations in the first transaction such that no two write operations write to the same row may avoid row locks since there are no more than one operation per row. By avoiding row locks the system may eliminate another source of delays when committing the first transaction to the first database.

In some embodiments, certain operations may be combined into a single prepared statement. Prepared statements may appear similar to regular statements, but use placeholders for the columns and a large number of rows may be passed as a parameter. Prepared statements greatly improve the performance since prepared statements behave similarly to a single statement in regards to parsing and wire protocol handshake. For example, all delete operations that have the same number of primary key columns as there are primary key columns in the table may be combined into a single prepared statement. In another example, insert operations that have the same number of columns as the table, the insert operations may be combined into a single prepared statement. Using prepared statements in this way represents a more efficient technique than performing separate delete or insert operations per row.

Figure 7:
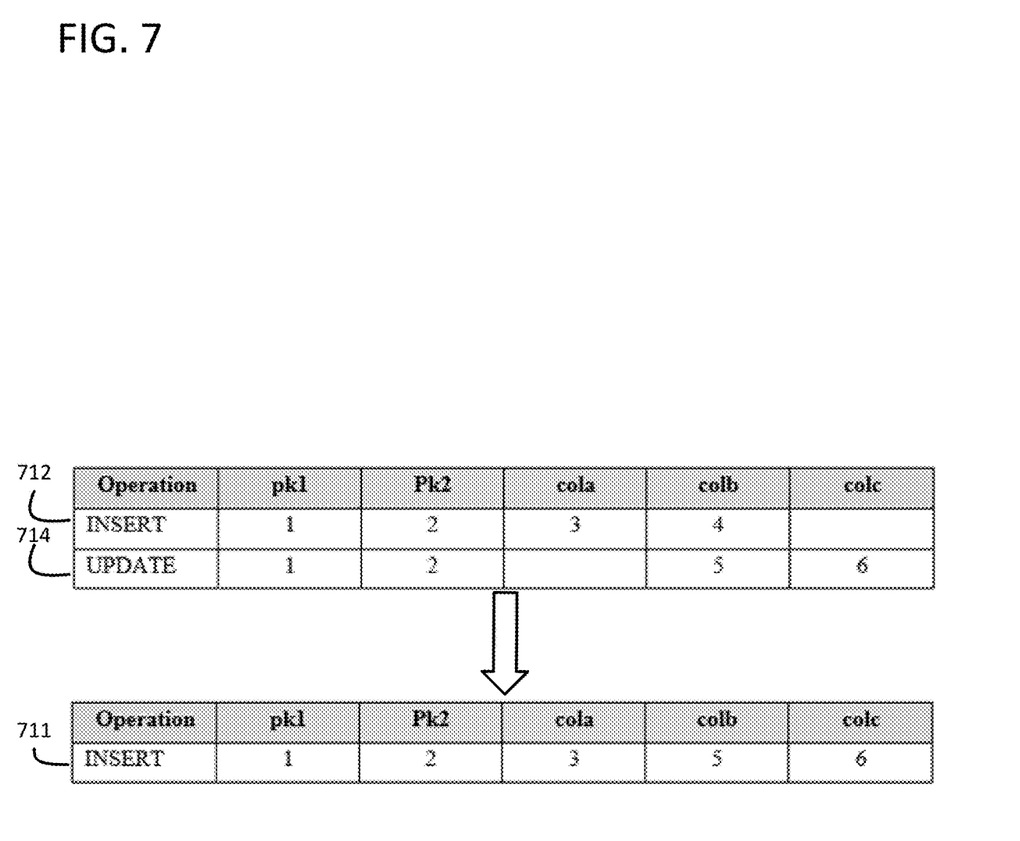
FIG. 7 shows an example of merging a first write operation and a second write operation to generate a third write operation according to one or more aspects of the disclosure.

Turning to FIG. 7, an example of combining a first write operation 712 and a second write operation 714 to generate a third operation 711 is described. First write operation 712 may be a write operation:

INSERT INTO table (pk1,pk2,cola,colb) VALUES(1, 2, 3, 4);

First write operation 712 is an insert row operation that operates on a table identified as "table." First write operation 712 includes two primary key columns: pk1 and pk2. The values of pk1 and pk2 are 1 and 2, respectively. Additionally, first write operation 712 includes two non-primary key columns cola and colb. The values of cola and colb are 3 and 4, respectively.

Second write operation 714, which comes after first write operation 712, may be a write operation of the form:

UPDATE table SET colb=5,colc=6 WHERE pk1=1 and pk2=2;

Second write operation 714 is an update row operation that operates on a table identified as "table." Second write operation 714 updates the value of non-primary key column colb with the value of 5 and adds a new non-primary key column, colc, with a value of 6 in rows where the value of pk1 is 1 and the value of pk2 is 2. In analyzing first write operation 712 and second write operation 714, one may recognize that they write to the same table by both identifying "table." Furthermore, one may identify that first write operation 712 and second write operation 714 write to the same rows, specifically those rows where pk1 is equal to 1 and pk2 is equal to 2. Thus, first write operation 712 and second write operation 714 may be combined to generate third write operation 711 as:

INSERT INTO table (pk1,pk2,cola,colb,colc) VALUES (1, 2, 3, 5, 6);

Third write operation 711 is an insert row operation that writes to the table identified as "table." Like first write operation 712, third write operation 711 the values of pk1, pk2, and cola are set to 1, 2, and 3, respectively. However, third write operation 711 differs from first write operation 712 by updating the value of colb from 4 to 5 and adds additional non-primary key column colc and sets the value of colc to 6, both of which are defined by second write operation 714. Thus, first write operation 712 and second write operation 714 may be combined to generate functionally equivalent third write operation 711. As noted above, this reduces the number of write operations in the first transaction to the point where no two write operations write to the same row. This may allow the reduced number of plurality of transactions to be written to the database in parallel, significantly improving the time it takes to write the plurality of transactions to the first database if they had to be written to the first database in series.

Figure 8A:
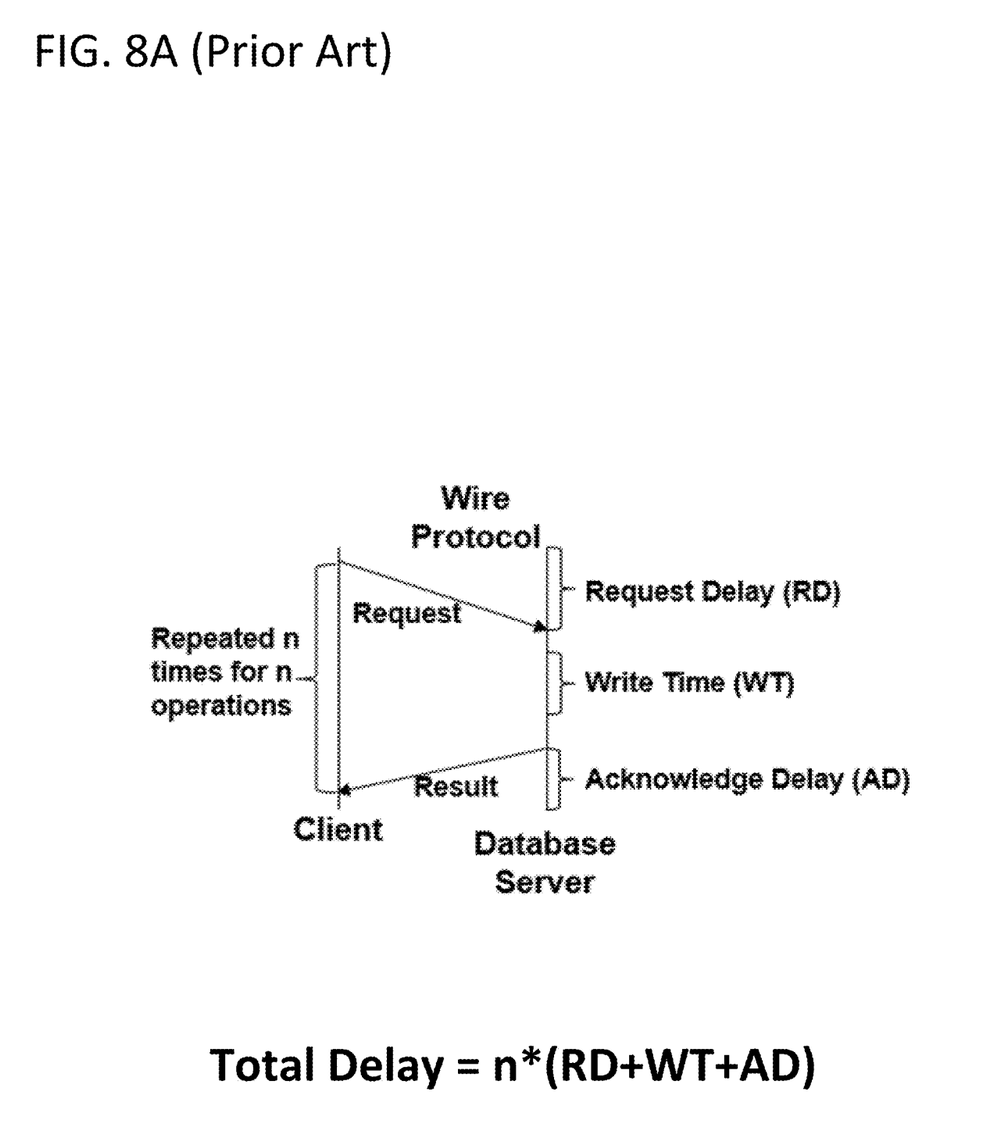
FIG. 8A shows an example of a delay realized by performing database operations in series according to prior art techniques for performing database operations.

As noted above, traditional databases perform operations (i.e., read operations, write operations) in series. Each operation includes a request—which includes a request delay (RD), a read or write time—which consumes an amount of time (WT), and an acknowledgement—which also includes an acknowledgement delay (AD). FIG. 8A shows an example of the delay realized by performing database operations in series. FIG. 8A shows that for n write operations performed in series, the total delay (TD) may be calculated by $$TD=n*(RD+WT+AD).$$

Further, the total network delay (ND) may be determined by calculating:

$$ND=n*(RD+AD).$$

In this regard, the network delay may be used as an indicator for network congestion. Based on the foregoing, it becomes apparent that performing database operations in series creates inefficiencies that may significantly inhibit the performance of a database, which, in turn, may prevent the database from scaling.

Figure 8B:
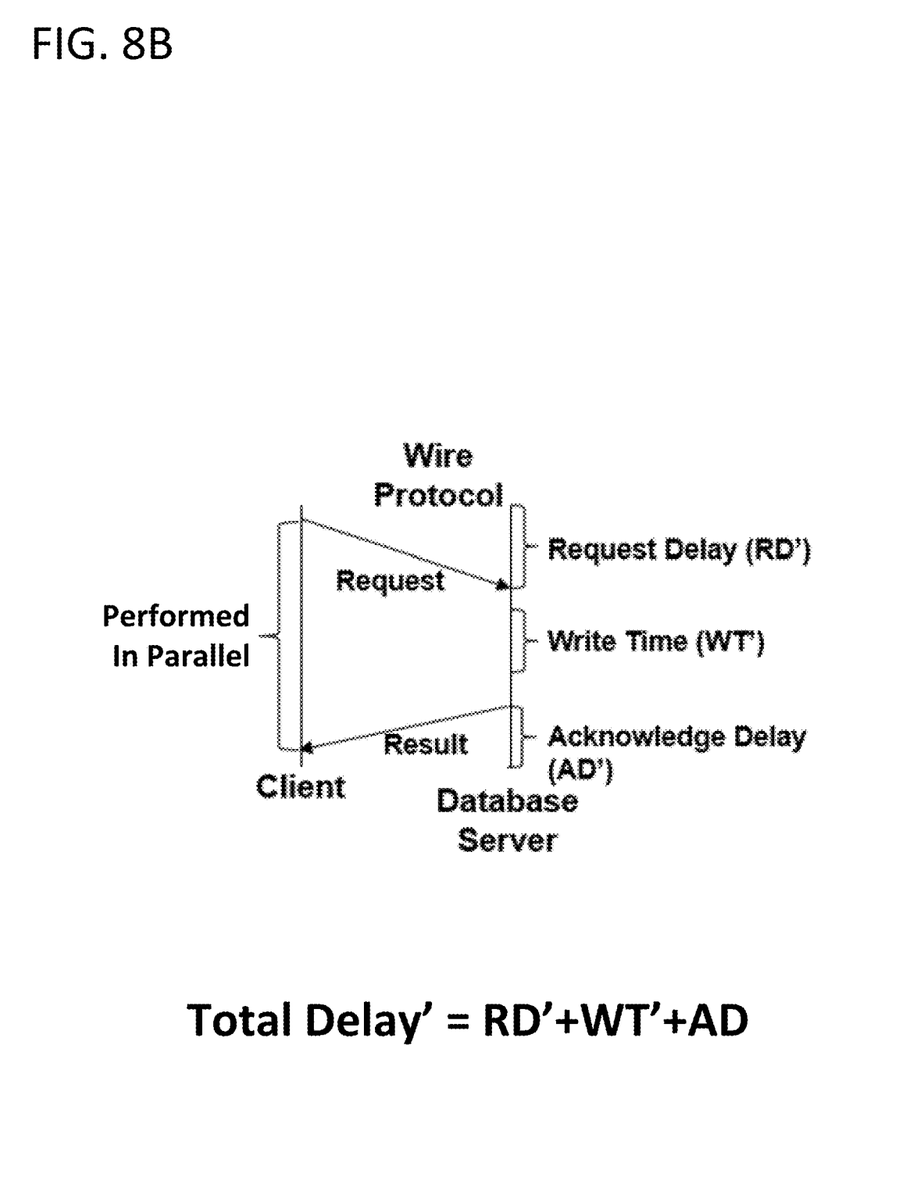
FIG. 8B shows an example of improvements realized by performing operations on a database in parallel in accordance with one or more aspects of the disclosure.

FIG. 8B shows an example of improvements realized by performing operations on a database in parallel in accordance with one or more aspects of the disclosure. As noted above, the algorithms and techniques described herein reduce the number of write operations in a first transaction such that no two write operations write to the same row. This allows the reduced number of the plurality of the write operations to be written to the first database in parallel. By writing the plurality of write operations to the first database in parallel, the delays with associated with writing transactional data to a database is significantly reduced. That is, by performing the write operations in parallel, the network delay may be reduced from n*(RD+AD) to RD'+AD'. While the request delay (RD') and acknowledgement delay (AD') may be longer due to more bytes being transmit, performing the database operations in parallel realizes significant improvements when compared to performing the operations in series. Furthermore, row locks may be avoided because no two write operations write to the same row may avoid row locks since there are no more than one operation per row. By avoiding row locks the system may eliminate another source of committing the first transaction to the first database. Thus, the techniques described herein improve database operations by reducing the amount of time it takes to commit a transaction to a database.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   receiving, by a first computing device, a transaction, wherein the transaction comprises a plurality of operations including a write operation to a row of a table;
   determining that a delete operation to the row of the table occurs after the write operation in the plurality of operations;
   deleting the write operation from the transaction to reduce a number of write operations in the plurality of operations;
   further reducing the number of write operations by replacing, a first update operation and a second update operation, with a third update operation, wherein the second update operation adds at least one column to the first update operation; and
   writing the reduced number of write operations in the plurality of operations to a database in parallel, wherein no two write operations in the reduced number of write operations write to a same row in the database.

2. The computer-implemented method of claim 1, further comprising:
   generating a first hash value from a first value in a primary key column of the write operation;
   generating a second hash value from a second value in the primary key column of the delete operation; and
   determining the write operation and the delete operation operate on the row when the first hash value is equal to the second hash value.

3. The computer-implemented method of claim 2, wherein the write operation is stored in a hash table based on the first hash value.

4. The computer-implemented method of claim 1, wherein the reduced number of write operations are written to the table as a single transaction.

5. The computer-implemented method of claim 1, further comprising:
   reducing the number of write operations by replacing a first insert operation and a update operation with a second insert operation, wherein the second insert operation comprises columns from the first insert operation being overwritten by columns in the update operation.

6. The computer-implemented method of claim 1, further comprising:
   reducing the number of write operations by replacing, a fourth update operation and a fifth update operation, with a sixth update operation, wherein the fifth update operation overwrites columns in the fourth update operation.

7. The computer-implemented method of claim 1, further comprising:
   receiving the transaction from a first application via a database interface.

8. A system comprising:
   a database interface configured to receive a transaction, wherein the transaction comprises a plurality of operations including a write operation to a row of a table;
   one or more processors; and
   memory storing instructions that, when executed by the one or more processors, cause the system to:
      determine that a delete operation to the row of the table occurs after the write operation;
      delete the write operation from the transaction to reduce a number of write operations in the plurality of operations;
      further reduce the number of write operations by replacing, a first update operation and a second update operation, with a third update operation, wherein the second update operation adds at least one column to the first update operation; and
      write the reduced number of write operations in the plurality of operations to a database in parallel, wherein no two write operations in the reduced number of write operations write to a same row in the database.

9. The system of claim 8, wherein the instructions, when executed by the one or more processors, cause the system to:
   generate a first hash value from a first value in a primary key column of the write operation, wherein the write operation is stored in a hash table based on the first hash value;
   generate a second hash value from a second value in the primary key column of the delete operation; and determine the write operation and the delete operation operate on the row when the first hash value is equal to the second hash value.

10. The system of claim 8, wherein the instructions, when executed by the one or more processors, cause the system to:
reduce the number of write operations by replacing a first insert operation and a update operation with a second insert operation, wherein the second insert operation comprises columns from the first insert operation being overwritten by columns in the update operation.

11. The system of claim 8, further comprising:
reducing the number of write operations by replacing, a fourth update operation and a fifth update operation, with a sixth update operation, wherein the fifth update operation overwrites columns in the fourth update operation.

12. The system of claim 8, wherein the database interface is configured to receive the transaction from a first application.

13. The system of claim 9, wherein the instructions, when executed by the one or more processors, cause the system to:
store the write operation in the hash table based on the first hash value.

14. The system of claim 8, wherein the instructions, when executed by the one or more processors, cause the system to:
write the reduced number of write operations to the table as a single transaction.

15. A non-transitory computer-readable medium storing instructions that, when executed, cause a server:
receive a transaction, wherein the transaction comprises a plurality of operations including a write operation to a row of a table;
determine that a delete operation to the row of the table occurs after the write operation in the plurality of operations;
delete the write operation from the transaction to reduce a number of write operations in the plurality of operations;
further reduce the number of write operations by replacing, a first update operation and a second update operation, with a third update operation, wherein the second update operation adds at least one column to the first update operation; and
write the reduced number of write operations in the plurality of operations to a database in parallel, wherein no two write operations in the reduced number of write operations write to a same row in the database.

16. The non-transitory computer-readable medium of claim 15, wherein the instructions, when executed, cause the server to:
generate a first hash value from a first value in a primary key column of the write operation, wherein the write operation is stored in a hash table based on the first hash value;
generate a second hash value from a second value in the primary key column of the delete operation; and
determine the write operation and the delete operation operate on the row when the first hash value is equal to the second hash value.

17. The non-transitory computer-readable medium of claim 15, wherein the instructions, when executed, cause the server to:
reduce the number of write operations by replacing a first insert operation and a update operation with a second insert operation, wherein the second insert operation comprises columns from the first insert operation being overwritten by columns in the update operation.

18. The non-transitory computer-readable medium of claim 15, wherein the instructions, when executed, cause the server to:
receive the transaction from a first application via a database interface.

19. The non-transitory computer-readable medium of claim 16, wherein the instructions, when executed, cause the server to:
store the write operation in the hash table based on the first hash value.

20. The non-transitory computer-readable medium of claim 15, wherein the instructions, when executed, cause the server to:
write the reduced number of write operations to the table as a single transaction.

* * * * *